(12) United States Patent
Brendle et al.

(10) Patent No.: US 7,720,992 B2
(45) Date of Patent: May 18, 2010

(54) TENTATIVE UPDATE AND CONFIRM OR COMPENSATE

(75) Inventors: Rainer Brendle, Neckargemuend (DE); Peter Eberlein, Malsch (DE); Guenter Zachmann, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1084 days.

(21) Appl. No.: 11/050,657

(22) Filed: Feb. 2, 2005

(65) Prior Publication Data

US 2006/0171405 A1 Aug. 3, 2006

(51) Int. Cl.
*G06F 15/16* (2006.01)
(52) U.S. Cl. .................................. 709/237; 709/236
(58) Field of Classification Search ................ 709/237, 709/223
See application file for complete search history.

(56) References Cited

U.S. PATENT DOCUMENTS

| | | | | |
|---|---|---|---|---|
| 6,275,843 | B1 * | 8/2001 | Chorn .......................... | 718/101 |
| 6,430,562 | B1 * | 8/2002 | Kardos et al. ................. | 707/10 |
| 7,146,427 | B2 * | 12/2006 | Delaney et al. ............. | 709/237 |
| 7,293,201 | B2 * | 11/2007 | Ansari ......................... | 714/38 |
| 2002/0188653 | A1 * | 12/2002 | Sun ............................. | 709/201 |
| 2003/0061266 | A1 * | 3/2003 | Ouchi ......................... | 709/106 |
| 2003/0200212 | A1 * | 10/2003 | Benson et al. ................. | 707/7 |
| 2005/0052664 | A1 * | 3/2005 | Ferlitsch ..................... | 358/1.6 |

OTHER PUBLICATIONS

Gray, J. et al., "The Dangers of Replication and a Solution", *SIGMOD '96*, Montreal, Canada, ACM., Inc. (Jun. 1996), pp. 173-182.

* cited by examiner

*Primary Examiner*—Patrice Winder
*Assistant Examiner*—Minh-Chau Nguyen
(74) *Attorney, Agent, or Firm*—Fish & Richardson P.C.

(57) ABSTRACT

Methods and apparatus, including computer program products, for communications in a distributed software system. An operation request from a remote computer is received, and provisionally executes an operation identified by the operation request. A first message is generated. The first message contains a transaction identifier identifying the operation request, an unsuccessful indicator flag, and a temporary data store. The temporary data store identifies tentatively written data generated by the operation. The first message is stored in a message store. If the successful completion of the operation is detected, a second message is generated. The second message contains the transaction identifier as well as a successful indicator flag. The second message is stored in the message store, and the message is transmitted to the remote computer. If the failure of the operation is detected, the message stored in the message store is transmitted to the remote computer.

15 Claims, 2 Drawing Sheets

TENTATIVE UPDATE AND CONFIRM OR COMPENSATE

BACKGROUND

The present invention relates to data processing by digital computer, and more particularly to communication between components on a distributed software system.

A distributed software system is made up of multiple software components operating on one or more computers. There can be multiple components on one single computer, or the components can be distributed across multiple computers. The computers can be in the same location and connected by a local network, or physically distant from each other and connected by a wide area network.

In such a system, the individual components must be able to communicate with one another. Since a distributed software system is made up of a variety of software components, a communications method is required that can be understood by all of the components. One implementation of such a method is a transactional model.

By implementing a transactional model, multiple software components can work concurrently, while avoiding conflicts and errors. For example, if multiple clients interact with the same database table concurrently, it is possible that interleaved database operations could leave the table in an inconsistent state. The transactional model defines when and how each operation can proceed, ensuring that operations that conflict cannot be executed simultaneously.

Further, a transactional model can provide details on how to handle failures that can naturally occur during the execution of an operation. For example, a database update operation might involve several dependent tables. If the computer system fails when the database update is only partially completed, the database could potentially be left in an inconsistent, even inoperable, state. The transactional model can define how to rollback the original operation, such that the system can be left in the same state as it was before the failed operation was initiated.

SUMMARY OF THE INVENTION

The present invention provides methods and apparatus, including computer program products, that implement techniques for communications in a distributed software system.

In one general aspect, the techniques feature receiving an operation request from a remote computer, and provisionally executing an operation identified by the operation request. The techniques also include generating a first message, where the first message contains a transaction identifier identifying the operation request, a flag indicating the unsuccessful completion of the operation, and a temporary data store, where the temporary data store identifies tentatively written data generated by the operation. The techniques further include storing the first message in a message store. If and only if the successful completion of the operation is detected, the techniques include generating a second message, where the second message contains the transaction identifier as well as a flag indicating the successful completion of the operation, storing the second message in the message store, where the second message takes the place of the first message, and transmitting the message stored in the message store to the remote computer. If and only if the failure of the operation is detected, the techniques include transmitting the message stored in the message store to the remote computer.

The invention can be implemented to include one or more of the following advantageous features. The first message may be a compensation message and the second message may be a confirmation message. The transaction identifier may include a unique identifier and identification data associated with a particular transaction. Only one of the first message or the second message may be stored in the message store at any point in time. The failure of the operation may be detected if a predetermined amount of time has elapsed since the most recent communication associated with the operation request was received.

The invention can be implemented to realize one or more of the following advantages. Components of a distributed computing system can communicate without a significant impact on system performance. Resources need not be shared between the components of a proposed transaction. Data consistency across components can be ensured. No locks are required to be held across components. Data written to the temporary data store can be made visible to concurrent transactions. Compensation and confirmation messages may make use of a business semantic that can be understood by nontechnical users. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
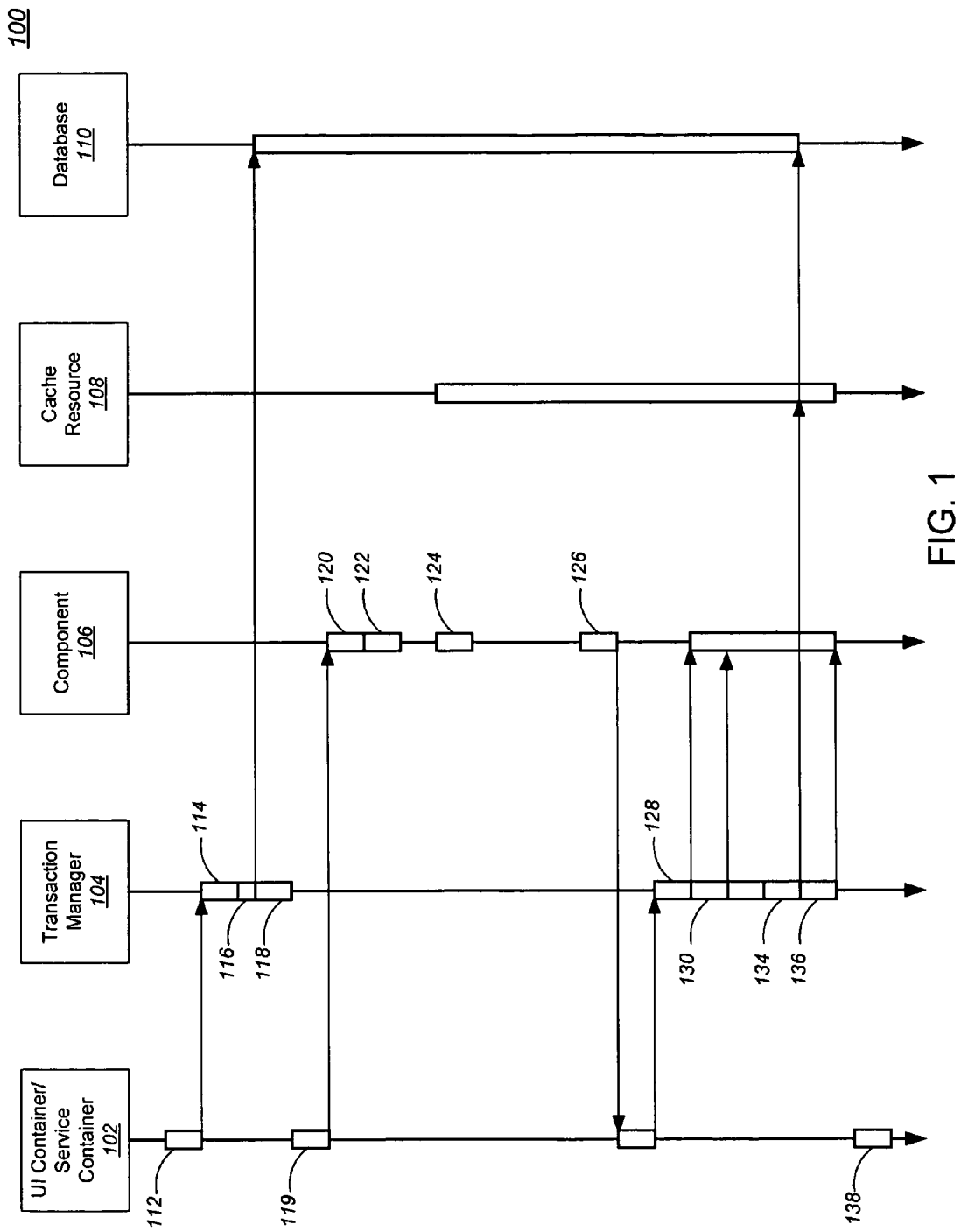
FIG. 1 is a diagram of a single-call transaction system.

In order to utilize resources across multiple software components or multiple users within a system, a transactional model can be implemented to provide for the allocation and deallocation of specific resources across the system. FIG. 1 shows the workings of a typical single-call transaction system 100. A request 112 to perform an operation on a specific database is issued by a service container 102. A transaction manager 104 generates a new transaction 114 associated with this request. The transaction manager 104 then proceeds to identify and allocate 116 the primary resource (in this instance, the database 110) required by the request 112. By allocating and locking (118) a portion of or all of the primary resource, depending on the nature of the resource required, the transaction manager 104 ensures that no other process can access the same resource simultaneously, either intentionally or inadvertently. It is important to avoid possible conflicts in the allocation of a specific resource, which can result in errors, failures, data corruption, or other negative consequences.

The system can then proceed to use (119) the component 106 required to complete the requested operation. The system can use a single component or multiple components to complete the requested operation. The component 106 can access (122) the primary resource, database 110. In one implementation, accessing (122) the primary resource causes a new transaction to be created by the transaction manager, the new transaction being a child transaction of the original transaction generated by the transaction manager 104. The component 106 can also access (124) the cache resource 108 by creating a child transaction of the original transaction. Once all of the necessary tasks to complete the original operation have been completed, the changes must be saved to the database. First, the component 106 must release (126) any child transactions that it had requested, in order to indicate that the component 106 no longer requires access to the database 110 or the cache resource 108.

Next, the transaction manager 104 must commit the changes to the database and release the database resource, making it available to any other process that requires access to the database. The transaction manager completes any before-save tasks (128), and then proceeds to save (130) the changes that were made. At this point, the transaction manager can commit (134) the database 110, revising, creating, or deleting (as applicable) any modified, new, or unwanted records in the database 110. At this point, the database resource is released, making it available to other processes. Also, any tentative changes are removed from the cache resource 108, now that the changes have actually been made to the database 110. The transaction manager then performs cleanup (136), ensuring that the transaction has completed successfully and that the system is left in a clean state, ready for future use. Finally, the service container 102 produces a response (138) indicating that the requested operation has been successfully completed.

Under the tentative update and confirm or compensate protocol, there must be a minimum level of trust between the components involved, as the protocol requires that a contract between the components be strictly observed. This contract requires that the local component send either a confirm or a compensate message once its local transaction has ended, no matter how it has ended. Ordinarily, if the local transaction ends successfully, a confirm message is sent indicating that any tentative updates can be committed, converting the tentative updates into permanent updates. Alternatively, if the local transaction is unsuccessful or otherwise terminated, a compensation message is transmitted indicating that the tentative updates need to be rolled back. However, the local component must also be able to handle any kind of failure that aborts the transaction in an atypical manner, such as a system crash, and send the appropriate confirm or compensate message in the same manner as described above.

The contract also requires that the remote component convert tentative updates into permanent updates when it receives a confirm message, or undo the tentative updates when it receives a compensate message, no matter what happens to the remote component in the meantime. Again, the remote component must be able to handle fatal errors such as a system crash. This applies to all updates performed in the remote component, including entries added to the process persistence. If no tentative updates have been made the compensate message can be ignored.

With this contract in effect, the local component can rely on the remote component to bring the remote transaction to the same end as the local transaction at the local component. The local component is required to send a confirm message with the commit of its local transaction, or send a compensate message if the local transaction fails.

The remote component can rely on the local component to inform it about the success of the local transaction, and must not take any actions on the tentative updates until notified to do so. In particular, the remote component must not set a timeout to automatically undo tentative updates when a certain period of time has elapsed, as this would breach the contract since the remote component is required to convert tentative updates into permanent updates when it receives a confirm message. The remote component would not be able to do so if it had deleted the tentative updates.

However, until this process is complete, the system must be monitored to detect any breach of contract. Although a breach of contract between the components is not desirable, the contract can be breached in a variety of manners, such as user intervention or software errors. Therefore, it is important that the system be able to handle a situation where the contract is not upheld. Under the tentative update and confirm or compensate protocol, any breach of contract is detected at the remote component, and is also resolved at the remote component.

If the remote component neither receives a confirm message nor a compensate message for an extended period of time, the status of the transaction in the local component for which the tentative update was requested should be investigated.

If it is determined that the local transaction has failed, the tentative updates can be deleted without a compensate message to obtain transactional consistency. If it is determined that the local transaction has completed successfully, the conflict needs to be resolved manually; it is typically not sufficient to convert the tentative updates into permanent updates as the lost confirm message may contain additional data that is now missing in the remote component.

Otherwise, the local transaction can be allowed to continue, and the status of the local component can be checked again at a later time. Alternatively, if the system determines that a sufficient amount of time has elapsed for the local component to reach a conclusion (either a successful or failed conclusion), the local transaction can be aborted.

If the remote component cannot convert the tentative updates into permanent updates when it receives a confirm message, or cannot undo the tentative updates when it receives a compensate message, this situation is regarded as an error that must be resolved manually.

As described above, the tentative update and confirm or compensate protocol requires that the local component send either a confirm or a compensate message once its local transaction has ended, no matter how it has ended. In order to guarantee this behavior in any situation, e.g., a system crash during the running transaction, the local component prepares a defensive compensate message before it sends a tentative update message. If the transaction fails for any reason, the already prepared defensive compensate message gets sent. If the transaction succeeds, the local component replaces the defensive compensate message with the confirm message so this message gets sent instead. Note that both compensate and confirm messages are sent asynchronously with delivery semantics exactly-once to guarantee that these messages reach their destination as demanded by the contract.

In one implementation, the local component prepares the defensive compensate message by creating a compensate message and filling it with the following information required by the remote component to compensate tentative updates and monitor the observance of the contract: local component (for compensate purposes), local transaction identification (for compensate purposes), user name (for monitoring purposes), and a timestamp (for monitoring purposes). In one implementation, the local component can prepare the defensive compensate message by creating a web service proxy for the compensate message.

Instead of requesting the message to be sent immediately, it is registered with the local transaction manager. The transaction manager maintains the message in a separate database transaction to ensure that it is not lost even if the local transaction is rolled back. When the transaction ends, the transaction manager triggers the asynchronous sending of the message. There are two situations under which the transaction ends that need to be distinguished First, the transaction can end in a controlled manner, e.g., by an explicit commit or roll-back. In this case, the transaction manager realizes the end of the transaction and triggers the sending of the compensate message immediately. Alternatively, the transaction ends in an atypical manner, e.g., a system crash. In this case, the transaction manager does not gain control at the end of the transaction but scans for dangling compensate messages when the system is restarted. The transaction manager then triggers the sending of the compensate message.

All tentative updates requested by the local component thereafter carry the identification of the transaction at the local component so the remote component can tag the tentative updates and identify them later on to confirm or compensate them.

At the end of the local transaction the transaction manager of the local component replaces previously registered defensive compensate messages with the corresponding confirm messages. This replacement happens transactionally, together with all other local updates, and guarantees transactional integrity. If anything goes wrong before the final commit from the transaction manager, the message replacement is undone and the compensate message still gets sent.

In one implementation, an agent, such as a synchronous process agent, can be present in the local component to handle creation and processing of the appropriate compensate or confirm message, requesting of tentative updates, as well as interaction between the local component and the transaction manager.

Figure 2:
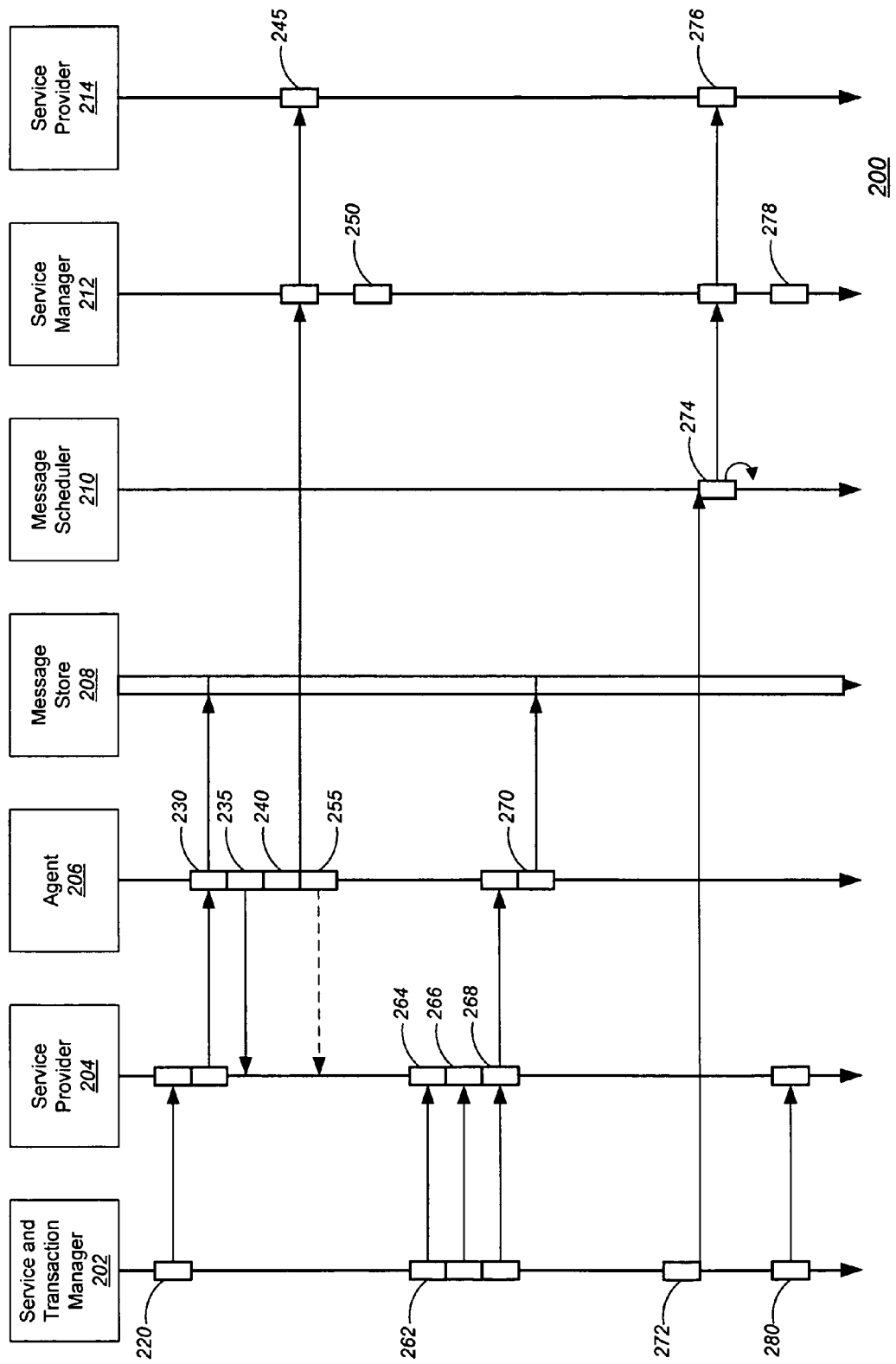
FIG. 2 is a diagram of a transaction system that makes use of tentative update and confirm or compensate features.

FIG. 2 shows a typical working of a transaction system that makes use of the tentative update and confirm or compensate protocol. When a request is made, the request is received (220) by the service and transaction manager 202. The service and transaction manager 202 initiates a transaction that is associated to the request, and the transaction is sent to a service provider 204. The service provider 204 instructs an agent 206 to generate a compensate message 230. The agent 206 performs communication with a remote component. Specifically, the agent acts as a local representative of the remote component.

The compensation message contains a transaction identifier. The transaction identifier includes a unique identifier associated with the transaction, as well as identification data relating to the request. The identification data allows the service manager 212 to track back the transaction event to the point in time when the transaction was initiated. The identification data can also include information about the user and the system that created the original event requesting the transaction.

The compensation message is stored in a message store 208, which can be a transactionally secure storage location.

At this point, the agent 206 can retrieve any additional information required from the service provider 204. In one implementation, the agent 206 can then invoke (240) a second service by sending a message to a second service manager 212. The second service manager 212 interacts with a second service provider 214 in order to complete the original request. The second service provider stores (245) any information that it generates as tentative data. The service manager 212 then indicates that it has completed (250) the requested task, e.g., the service manager 212 performs a save operation.

If the original request is successfully completed, this tentative data is converted to final data, as described below, and is permanently stored in the applicable resource, e.g., a database. If for some reason the original request does not successfully complete, however, this tentative data will not be made permanent, and if necessary, the tentative data can also be used to roll back the system to the state it was in prior to the time that the failed request was made.

When the original request is completed, the service and transaction manager 202 then proceeds with the save process (262), indicating that the originally invoked request has been completed. In one implementation, such as during a stateless session, the remote component runs one transaction per tentative update. In this implementation, there is an implicit save at the end of each tentative update. In an alternative implementation, such as during a stateful session, the transaction at the remote component keeps running until immediately before the end of the transaction at the local component. If there are multiple tentative updates between these components, all of the updates are processed within the transaction at the remote component. At the local component, the save process is initiated by an explicit call.

During the complete/save process, the service and transaction manager 202 sends messages to the service provider 204 to conduct the pre-save process (264) and the save process (266). Next, if the original request has completed successfully, the service provider 204 instructs the agent 206 to generate a confirmation message 270 that is stored in the message store 208. The confirmation message contains the transaction identifier of the requested operation, as well as a flag indicating that the requested operation has successfully completed.

The confirmation message 270 replaces the compensation message 230 that was originally stored in the message store 208. However, if the request that was originally invoked did not complete successfully, the confirmation message is not generated, and the compensation message 230 remains in the message store 208. Further, as only one message associated with a particular transaction can be stored in the message store 208, only one of either the compensation message 230 or the confirmation message 270 for a particular transaction can exist at any point in time in the message store 208. This ensures that both of the messages cannot be delivered at the same time.

The service and transaction manager 202 then proceeds to commit (272) work associated with the transaction that was originally invoked. This entails the message scheduler 210 sending to the service manager 212 the message that is currently stored in the message store 208, e.g., the compensation message 230 or the confirmation message 270. Based on the message received by the service manager 212, the service provider 214 either makes final the tentative data previously stored if the service manager 212 received the confirmation message 270, or deletes the tentative data if the service manager 212 received the compensation message 230. In either situation, the service manager 212 then indicates that it has completed (278) the task, i.e., the service manager 212 performs a save operation. Finally, the service and transaction manager 202 and service provider 204 perform any cleanup operations (280) required to leave the system in a clean state, ready for the next service request.

In one implementation, the transaction identifier can provide information that allows the rollback of the system in the event that a transaction does not complete. Ordinarily, each individual transaction proceeds through the request and response cycle and is supposed to close after the requested operation has successfully completed. However, this is not always the case, as occasionally a transaction will fail to complete. The identification data contained in the transaction identifier is a record of the changes that were made to resources as the transaction progressed. Using this record, it is possible to return the system to the state it was in prior to the initiation of the failed transaction, by reversing the individual processes within the transaction request that have already taken place. In order to accomplish this, the system can provide reporting tools than enable the user to access the temporary data that has been stored. The removal of the temporary data can restore the system to the point in time prior to when the failed request was made. In an alternative implementation, the removal of the temporary data to restore the system to the point in time prior to when the failed request was made can proceed automatically, upon the detection of the failed request.

In another implementation, the tentative update and confirm or commit protocol can also be applied in a cascaded way, e.g., a component calls a remote component and this component calls another remote component provided that all components involved support the tentative update and confirm or commit protocol. In this implementation, the transaction of the first component defines when the confirm or compensate messages get sent and the second component only forwards this information to the third component but it does not generate confirm or compensate messages itself.

The system can optionally include a timeout feature. The timeout feature is particularly useful to prevent a situation where the system hangs due to the failure of a particular transaction. If a predefined amount of time elapses without the generation of a confirmation message, the system proceeds under the assumption that the request has failed. In such a situation, the system aborts the running transaction at the local component, which implicitly triggers the compensation message. The amount of time elapsed can be measured in a variety of manners as defined by either the user or the system designer, e.g., from the time of the initial transaction creation or from the time of the most recent communication related to the transaction. Upon reaching the timeout point, the system uses the compensation message to return the system to the point in time prior to when the failed request was made, as described above.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims.

What is claimed is:

1. A computer program, tangibly stored on a machine-readable storage device, comprising instructions operable to cause a computer to:

receive an operation request at a local component from a remote component;

provisionally execute an operation identified by the operation request at the local component;

generate tentative data based on the provisionally executed operation and store the tentative data in a temporary data store at the remote component;

generate a compensate message at the local component in response to receiving the operation request, wherein the compensate message contains a transaction identifier identifying the operation request, and a flag indicating the unsuccessful completion of the operation;

store the compensate message in a message store at the local component;

if and only if the successful completion of the operation is detected, generate a confirmation message, wherein the confirmation message contains the transaction identifier as well as a flag indicating the successful completion of the operation, store the confirmation message in the message store, such that the confirmation message replaces the compensate message in the message store;

if and only if the failure of the operation is detected, provide that, and with respect to the operation, only the compensate message remains in the message store;

transmit one of the compensate message and the confirmation message stored in the message store to the remote component, the tentative data being converted to final data if the confirmation message is transmitted, and the tentative data being deleted if the compensate message is transmitted; and revert at least one of the local component and the remote component to a state prior to provisional execution of the operation based on the transaction identifier by reversing individual processes of the operation request.

2. The computer program product of claim 1, wherein the operation affects at least one tentative update that is selectively committed based on one of the compensate message and the confirmation message.

3. The computer program product of claim 2, wherein the at least one tentative update that is rolled back if the failure of the operation is detected, and wherein the at least one tentative update is converted into a permanent update if successful completion of the operation is detected.

4. The computer program product of claim 1, wherein the transaction identifier includes a unique identifier and identification data associated with a particular transaction.

5. The computer program product of claim 1, wherein only one of the compensate message or the confirmation message can be stored in the message store at any point in time.

6. A computer-implemented method for communications in a distributed computer system, the method comprising:

receiving an operation request at a local component from a remote component;

provisionally executing an operation identified by the operation request at the local component;

generating tentative data based on the provisionally executed operation and store the tentative data in a temporary data store at the remote component;

generating a compensate message at the local component in response to receiving the operation request, wherein the compensate message contains a transaction identifier identifying the operation request, and a flag indicating the unsuccessful completion of the operations;

storing the compensate message in a message store at the local component;

if and only if the successful completion of the operation is detected, generating a confirmation message, wherein the confirmation message contains the transaction identifier as well as a flag indicating the successful completion of the operation, store the confirmation message in the message store, such that the confirmation message replaces the compensate message in the message store;

if and only if the failure of the operation is detected, providing that, and with respect to the operation, only the compensate message remains in the message store;

transmitting one of the compensate message and the confirmation message stored in the message store to the remote component, the tentative data being converted to final data if the confirmation message is transmitted, and the tentative data being deleted if the compensate message is transmitted; and reverting at least one of the local component and the remote component to a state prior to provisional execution of the operation based on the transaction identifier by reversing individual processes of the operation request.

7. The method of claim 6, wherein the operation affects at least one tentative update that is selectively committed based on one of the compensate message and the confirmation message.

8. The method of claim 7, wherein the at least one tentative update that is rolled back if the failure of the operation is detected, and wherein the at least one tentative update is converted into a permanent update if successful completion of the operation is detected.

9. The method of claim 6, wherein the transaction identifier includes a unique identifier and identification data associated with a particular transaction.

10. The method of claim 6, wherein only one of the compensate message or the confirmation message can be stored in the message store at any point in time.

11. A system having a transaction manager and one or more application components, the transaction manager managing operation requests directed to the application components, the system being characterized by:

a remote computer that generates an operation request; and means for receiving the operation request from the remote computer at a local component;

means for provisionally executing an operation identified by the operation request at the local component;

means for generating a compensate message in response to receiving the operation request, wherein the compensate message contains a transaction identifier identifying the operation request, a flag indicating the unsuccessful completion of the operation, and a temporary data store, wherein the temporary data store identifies tentatively written data generated by the operation;

a message store for storing the compensate message;

if and only if the successful completion of the operation is detected, means for generating a confirmation message, wherein the confirmation message contains the transaction identifier as well as a flag indicating the successful completion of the operation, store the confirmation message in the message store, such that the confirmation message replaces the compensate message in the message store;

if and only if the failure of the operation is detected, means for providing that, and with respect to the operation, only the compensate message remains in the message store;

means for transmitting one of the compensate message and the confirmation message stored in the message store to the remote component, the tentative data being converted to final data if the confirmation message is transmitted, and the tentative data being deleted if the compensate message is transmitted; and means for reverting at least one of the local component and the remote component to a state prior to provisional execution of the operation based on the transaction identifier by reversing individual processes of the operation request.

12. The system of claim 11, wherein the operation affects at least one tentative update that is selectively committed based on one of the compensate message and the confirmation message.

13. The system of claim 12, wherein the at least one tentative update that is rolled back if the failure of the operation is detected, and wherein the at least one tentative update is converted into a permanent update if successful completion of the operation is detected.

14. The system of claim 11, wherein the transaction identifier includes a unique identifier and identification data associated with a particular transaction.

15. The system of claim 11, wherein only one of the compensate message or the confirmation message can be stored in the message store at any point in time.

* * * * *